C. N. DENNETT.

SHIFTING-SEAT CARRIAGE.

No. 7,749. Reissued June 19, 1877.

WITNESSES.
Samuel D. Kelly.
Eugene Humphrey

INVENTOR.
Charles N. Dennett
By Porter & Hutchinson
Attorneys

N. PETERS, PHOTO-LITHOGRAPHER, WASHINGTON, D. C.

UNITED STATES PATENT OFFICE.

CHARLES N. DENNETT, OF SALISBURY, MASSACHUSETTS.

IMPROVEMENT IN SHIFTING-SEAT CARRIAGES.

Specification forming part of Letters Patent No. 173,774, dated February 22, 1876; reissue No. 7,749, dated June 19, 1877; application filed January 24, 1877.

*To all whom it may concern:*

Be it known that I, CHARLES N. DENNETT, of Salisbury, in the county of Essex and State of Massachusetts, have invented certain Improvements in Shifting-Seat Carriages, of which the following is a full, clear, and exact description, reference being had to the accompanying drawings, in which—

Figure 1:
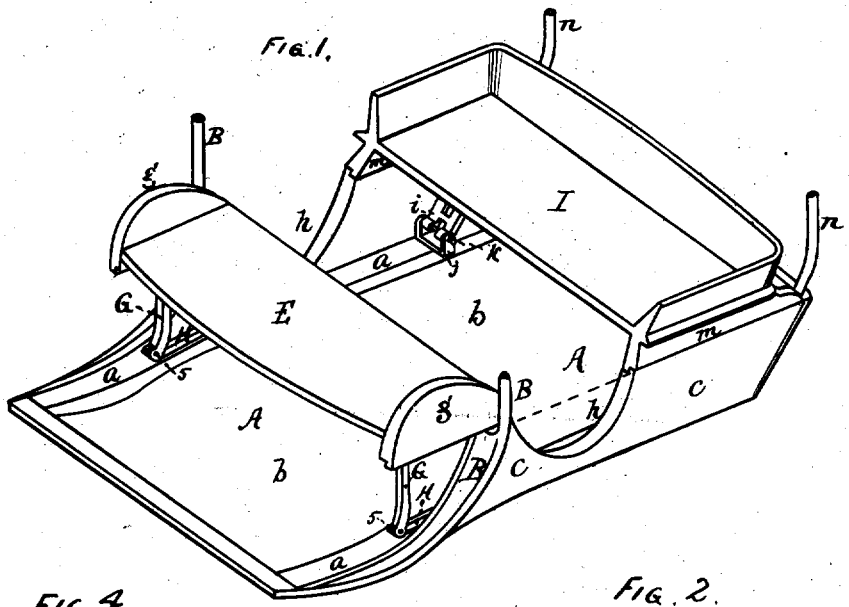
Figure 4:
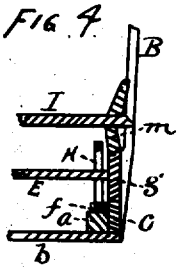
Figure 2:
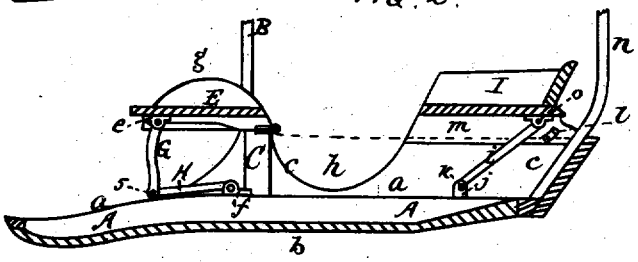
Figure 5:
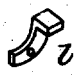
Figure 6:
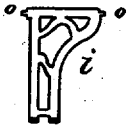
Figure 3:
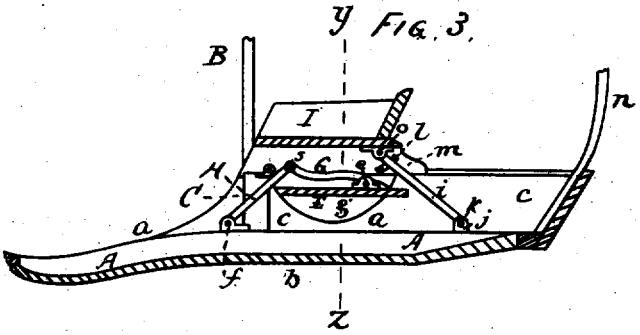

Figure 1 is a perspective view of a carriage-body with both seats in position for use, and with my improvements applied thereto. Fig. 2 is a longitudinal section through the center of the carriage, the seats being in the position shown in Fig. 1. Fig. 3 is a section similar to Fig. 2, but showing the front seat turned down and the back seat jumped forward in position for use. Fig. 4 is a transverse vertical section taken on line *y z*, Fig. 3. Fig. 5 is a perspective view of the stop which locks the back seat when jumped forward. Fig. 6 is a front or rear elevation of one of the jumping-irons.

Similar letters of reference indicate the same parts in the several figures.

The object of my invention is to effect certain improvements in that class of vehicles known as "jump-seat carriages," and more especially those formed or provided with a canopy or standing top; and the invention consists, first, in so forming the front top posts and securing them to the body or panels that the front or turn-out seat may be of an equal width with the body of the vehicle, and yet, when turned down or out, pass freely between said posts; second, in combining, with a jump-seat and cut-down panels in a canopy-top carriage, a turn-out front seat, the ends or arms whereof curtain the space so cut out of the side panels, thereby giving a finished and entire appearance to the panels when the front seat is turned down and the back seat is in position for use; third, the combination, in a canopy-top carriage, of a jump-seat, cut-down panels, and a turn-out seat, constructed and arranged in such manner that when turned down the ends shall supply the cut-out part of the panel, and shall be flush therewith, giving the appearance of an entire high panel; fourth, a canopy-top carriage having cut-down panels and a turn-out seat, so constructed that when turned down the ends shall fill the cut-out space in the panel and give the carriage side the appearance of a whole panel; fifth, the combination of a folding or turn-down seat and a jump-seat of equal widths, constructed and arranged with but one pair of jumping-irons, attached to the back corners thereof in such manner as to serve both to jump and guide the said seat; sixth, in combining with the jumping-irons stops or locks, by which to fasten the back seat in position when it is jumped forward.

In the said drawings, A represents the carriage-body, composed of the sills *a*, floor *b*, and panels *c c*, secured to the outside of the sills in the usual manner. B B are the front top posts, the lower ends of which are curved or bent, while subjected to the influence of steam or otherwise, to conform to the curve of the panel, and are glued and screwed to the outside of the panels, being also bolted through them to the standards C, secured in and rising from the sills, flush with the outside thereof. At a point at or near the level of the top of the standards and panels each post is cut away upon its inner side from said point upward, so as to allow ample room for the front seat E to be swung upon its hinges freely between these posts. In Fig. 4 the form and relations of the posts are shown with the front seat folded down and the back seat jumped forward. On the under side of each end of the front of the forward seat E is a metal plate, *e*, to which is pivoted one end of a rod, G, the other end of which is joined at 5 to a second rod, H, having its opposite end pivoted to a plate, *f*, secured to the upper side of the sill *a* at a point in proximity to the foot of the standard C, and each end of the rear of this front seat is pivoted to the top of its standard, by which construction, when the seat is thrown forward into position ready for use, its front is supported at each end by the rods G H at the junction of their inner ends, being then in such position that at the joint 5 they will bear upon the sill, while the rear corners of the seat are supported by the standards C C, to the tops of which the seat is hinged. (See Figs. 1, 2, 3.)

Before the invention of my improvements in canopy-top jump-seat carriages, the front seats were made as much narrower than the body as the thickness of both front posts; hence, if a cut-down had been made in the panel, it could not have been filled by the ends of the front seat when turned down, and when thus turned down and the back seat I was jumped forward an unsightly space would have been left beneath it. But by virtue of my arrangement of the front posts I am enabled to so construct the front seat that its ends shall close the space cut away in the side panel, and hence I accomplish several highly useful results hitherto deemed impossible. These consist in the wide front seat, which is made as a turn-out seat, the filling and curtaining the entering spaces in the side panels with a turn-out seat in a canopy-top carriage, and also the combining of a turn-out seat and a jump-seat. By a "turn-out seat" is meant, a seat the ends or arms *g* of which curtain or close the entering spaces cut in the side panels, such seats having been before used, but not in canopy-top carriages. The ends or arms *g g* of the front seat are formed and arranged to fill or curtain the spaces *h h* cut away from the side panels, for convenience of ingress and egress to or from the back seat; and when only the back seat is to be used the front seat is turned down, as shown in Figs. 3 and 4, and the back seat I is jumped forward, as shown in Fig. 3, its ledges *m m* resting upon pillars C C, the panels *e*, and the ends H H of the front seat.

As the back seat cannot be provided with four jumping-irons, in the usual manner, for the reason that if such irons were attached to the front corners they would be brought in contact with the front seat, I provide two jumping-irons similar to that shown in elevation, Fig. 6, the lower ends of which are pivoted, by bolts *k*, to the ears of plates *j*, which are secured to the sills *a*, as shown. The upper end is widened so as to extend along the seat, and the pintles *o*, in which it terminates, are secured in suitable eyes attached to the seat. By thus extending the iron a sufficient distance transversely to the plane of its motion when being jumped, lateral vibration is prevented.

It is, of course, obvious that other forms of jumping-irons may be adopted which would accomplish the same result; but I prefer that shown, from its simplicity and effectiveness. When the seat I is jumped forward it is necessary that it be locked in that position, in order that it may not be suddenly turned over backward to the injury of the occupants. To thus secure it a small angle-plate, *l*, is secured to each of the ledges *m* upon the inside, in such position that when the seat is thus in use the angle of the plate shall engage the iron *i*, as shown in Fig. 3, and prevent the turning or tipping of the seat. The back canopy-posts *n n* may be constructed in the usual manner.

Having thus pointed out the several improvements invented by me, what I claim is—

1. A canopy or standing top carriage having its front posts B B secured to the outside of the panels, in combination with a shifting front seat, so that the seat of full width of the body may be turned back, substantially as described and shown.

2. In a canopy-top carriage, the combination of a back jump-seat and a turn-out seat the ends or arms whereof, when so turned down, are flush with the outside of the body-panels, substantially as described and shown.

3. In combination with a jump-seat and a cut-down panel in a four-post canopy-top carriage, a turn-down seat the arms or ends whereof fill or curtain the spaces *h* when the back seat is jumped forward for use as the single seat of the carriage.

4. The combination of a back jump-seat, a single pair of jumping-irons attached thereto at its rear edge, and a front seat of the full width of the back seat, whereby the back seat may be jumped forward and rest upon or above the front seat, substantially as described and shown.

5. The stops *l*, in combination with the single pair of jumping-irons *i* and the back seat I, when arranged to act automatically, as and for the purposes specified.

CHARLES N. DENNETT.

Witnesses:

CHAS. L. ALLEN,
GEO. ALLEN.